(12) United States Patent
Grannemann et al.

(10) Patent No.: US 11,028,874 B2
(45) Date of Patent: Jun. 8, 2021

(54) BALL JOINT

(71) Applicants: ZF Friedrichshafen AG, Friedrichshafen (DE); HONDA MOTOR CO., LTD., Tokyo (JP)

(72) Inventors: Bernd Grannemann, Espelkamp-Frotheim (DE); Lutz Pydde, Ankum (DE); Martin Rechtien, Neuenkirchen (DE); Jinghong Yu, Raymond, OH (US)

(73) Assignees: ZF Friedrichshafen AG, Friedrichshafen (DE); Honda Motor Co., Ltd., Tokyo (JP)

( * ) Notice: Subject to any disclaimer, the term of this patent is extended or adjusted under 35 U.S.C. 154(b) by 520 days.

(21) Appl. No.: 16/077,836

(22) PCT Filed: Jan. 16, 2017

(86) PCT No.: PCT/EP2017/050752
§ 371 (c)(1),
(2) Date: Aug. 14, 2018

(87) PCT Pub. No.: WO2017/140444
PCT Pub. Date: Aug. 24, 2017

(65) Prior Publication Data
US 2019/0055983 A1 Feb. 21, 2019

(30) Foreign Application Priority Data
Feb. 18, 2016 (DE) ...................... 10 2016 202 532.5

(51) Int. Cl.
*F16C 11/06* (2006.01)
(52) U.S. Cl.
CPC ...... *F16C 11/0647* (2013.01); *F16C 2326/01* (2013.01)

(58) Field of Classification Search
CPC .............. F16C 11/0647; F16C 11/0652; F16C 11/0657; F16C 11/0642; Y10T 403/32721; Y10T 403/32754; Y10T 403/32762
See application file for complete search history.

(56) References Cited

U.S. PATENT DOCUMENTS

| 3,493,280 A | 2/1970 | Herbenar |
| 5,293,688 A | 3/1994 | Koch et al. |

(Continued)

FOREIGN PATENT DOCUMENTS

| DE | 691 21 948 T2 | 3/1997 |
| DE | 10 2011 075 323 A1 | 11/2012 |
| DE | 10 2011 075 324 A1 | 11/2012 |

OTHER PUBLICATIONS

German Action Corresponding to 10 2016 202 532.5 dated Nov. 28, 2017.

(Continued)

*Primary Examiner* — Daniel J Wiley
(74) *Attorney, Agent, or Firm* — Finch & Maloney PLLC; Michael J. Bujold

(57) ABSTRACT

A ball joint with variable friction resistance for a vehicle, the joint having a stud with a joint ball which is held in a housing so as to articulate relative thereto. The housing comprises movable and static housing parts that are movable relative to one another and engage on opposite sides of the ball. A transmission is moved by one housing part so as to exert a variable pressure on the ball. The transmission has axially aligned transmission elements, each of which has a helical ball track. The transmission elements axially rest against one another via balls that are guided between the ball tracks of the transmission elements. A first transmission element can move axially and contact the movable housing part. A second transmission element can rotate about the (Continued)

rotational axis which causes the first transmission element to move axially and exert an axial force on the movable housing part.

17 Claims, 6 Drawing Sheets

(56) References Cited

U.S. PATENT DOCUMENTS

| | | | |
|---|---|---|---|
| 8,616,799 B2 | 12/2013 | Ersoy | |
| 9,291,196 B2 | 3/2016 | Ersoy et al. | |
| 2002/0071716 A1* | 6/2002 | Paduano | F16C 11/0647 403/137 |
| 2012/0282014 A1* | 11/2012 | Ersoy | F16C 11/0647 403/122 |
| 2012/0282015 A1* | 11/2012 | Ersoy | F16C 11/0652 403/133 |

OTHER PUBLICATIONS

International Search Corresponding to PCT/EP2017/050752 dated Apr. 12, 2017.
Written Opinion Corresponding to PCT/EP2017/050752 dated Apr. 12, 2017.

* cited by examiner

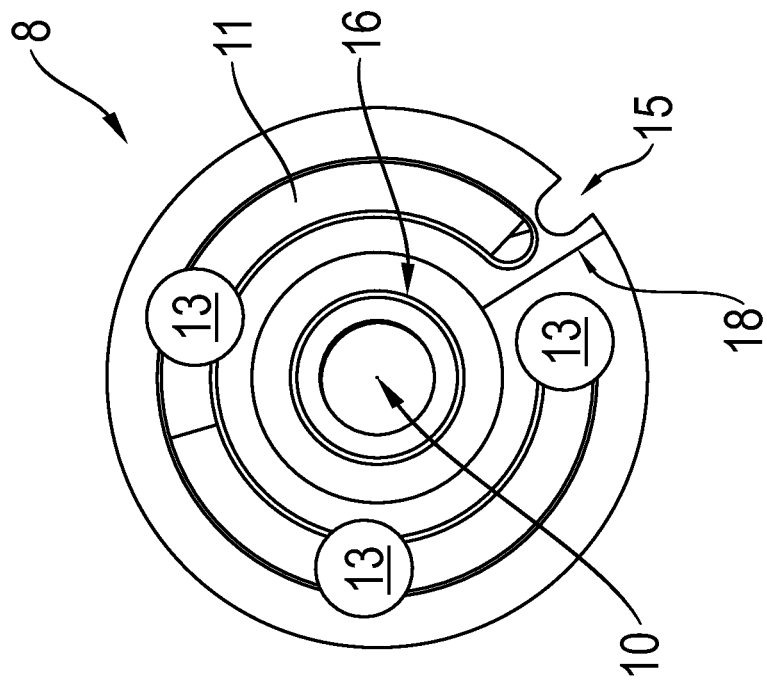
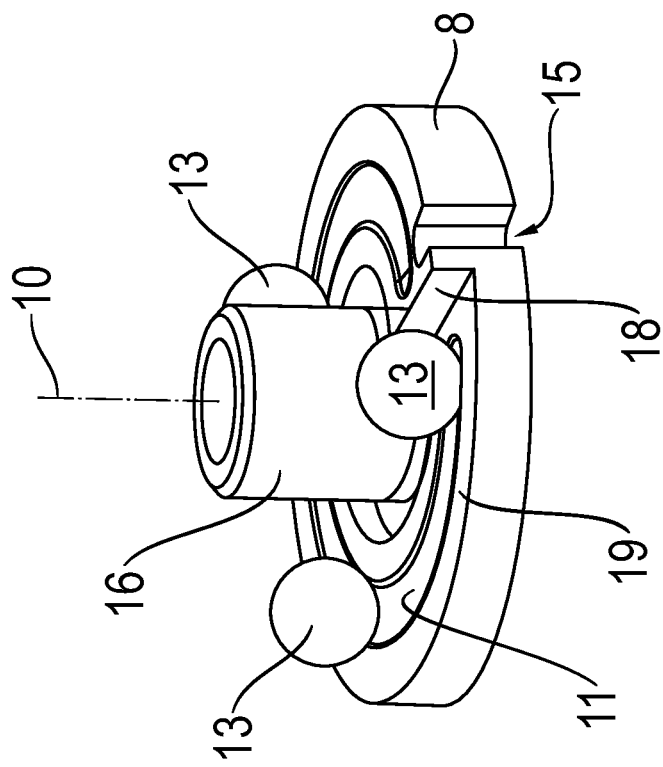
Fig. 5
Fig. 4

BALL JOINT

This application is a National Stage completion of PCT/EP2017/050752 filed Jan. 16, 2017, which claims priority from German patent application serial no. 10 2016 202 532.5 filed Feb. 18, 2016.

FIELD OF THE INVENTION

The invention relates to a ball joint with variable frictional resistance, in particular for a vehicle and a transmission.

BACKGROUND OF THE INVENTION

Ball joints have long been used in vehicles, especially in their chassis in various forms. In an entirely general sense they serve to connect two components to one another in such manner that they can rotate and pivot. The essential elements of a ball joint are a ball stud and a joint housing. The ball stud is provided with a joint ball which is held in the joint housing so that the ball stud is mounted in a manner articulated relative to the joint housing. During movement of the ball stud relative to the joint housing by virtue of the required rotation or pivoting movements, friction occurs between the surfaces of the ball stud and the joint housing or a bearing shell which is part of the joint housing. This friction impedes the movement of the ball stud relative to the joint housing.

For various reasons there is a need, for certain applications, to be able to actively influence the frictional resistance of the ball joint. From the design standpoint this can be done, for example, if the joint housing has two housing parts that can move relative to one another, which engage in the manner of jaws on opposite sides of the joint ball, such that at least one of the housing parts can be moved, in that way, in order to hold the joint ball fast more tightly or less so between the housing parts that can move relative to one another. Depending on the pressure exerted on the joint ball, the frictional resistance of the ball joint can be actively influenced in this way.

A concrete design of a ball joint with variable frictional resistance is known from DE 10 2011 075 323 A1. In the case of the ball joint disclosed therein, the joint housing comprises a fixed housing part and a housing part, in the form of a ring, that can be moved relative to it in the axial direction. Also associated with the ball joint is a transmission system that serves to convert the rotary movement (turning) of a screw into the translational movement (displacement) of the housing ring, in order in that way to exert a variable pressure on the joint ball. To convert the rotary movement into a translational movement, in the transmission system three balls are arranged, each of which is guided along a helical, axially rising ball track of its own in a rotatable first transmission part. This first part is supported by the balls relative to a second transmission part fixed to the housing, with the effect that the axial position of the first transmission part changes as a function of the rotational angle set. The transmission system used has appreciably greater efficiency than, for example, a spindle drive, but has the disadvantage that the required plurality (three) of helical, axially rising ball tracks are technically elaborate and expensive to produce and, furthermore, the possible rotational angle—and hence the stroke of the transmission—and the number of balls that can be used are severely limited. Moreover, by virtue of the crossing path of the helical ball tracks as viewed in axial projection, guiding is not ideal from the kinematic standpoint, since apart from low rolling friction it entails disadvantageously high sliding friction components.

SUMMARY OF THE INVENTION

An objective of the present invention is therefore to indicate a ball joint of the type mentioned to begin with, which can be produced in a favorable manner, which due to the largest possible rotational angle has a comparatively large transmission stroke, and which can also be mounted with more than three balls. A further objective of the present invention is to indicate a transmission for such a ball joint.

The objective is achieved by a ball joint according to the characteristics specified in the independent claims. This is a ball joint with variable frictional resistance, which is particularly suitable for a vehicle and which comprises essentially a ball stud with a joint ball and a transmission of particular design. The joint ball is held in a joint housing in order to be mounted into the latter in an articulated manner, and the joint housing comprises two housing components that can move relative to one another, which engage on opposite sides of the joint ball. By means of the transmission, at least one of the housing components can be moved in order to exert varying pressure on the joint ball. According to the invention, the ball joint is characterized in that the transmission comprises first and second transmission elements on each of which a ball track helically shaped in relation to a rotational axis is formed, such that the first and the second transmission elements are supported on one another in the axial direction via at least one ball guided between the ball tracks of the transmission element. In this case, the first transmission element is mounted so that it can move axially and can be brought into pressing contact with the movable part of the housing, whereas the second transmission element is mounted so that it can rotate about the rotational axis, so that by rotating the second transmission element the first transmission element can be moved axially in order to exert an axial force on the movable part of the housing.

Since with the transmission used the at least one ball guided between the ball tracks of the transmission elements is guided along a single ball track of helical shape, by virtue of the transmission a small drive torque can already produce a comparatively large axial force, so that the transmission occupies relatively little fitting space. Since on each of the transmission elements only a single respective ball track is formed, which in addition—due to the helical shape of the ball track—is circular or part-circular in axial projection, compared with the system known from DE 10 2011 075 323 A1 the production of the transmission elements is considerably more simple. Since the at least one ball is guided along a helically shaped ball track, with the ball joint having the transmission there is a close relationship between the rotational angle (of the second transmission element) and the axial adjustment path covered by the first transmission element by which the axial force acting upon the movable part of the housing is exerted. Consequently, the axial force can be determined precisely with reference to the rotational angle of the second transmission element.

The first and second transmission elements can respectively be differently designed components. Expediently, these are each in the form of disk-shaped bodies at least in part, on one axial surface of which in each case an all-round inclined plane containing the ball track is formed. Expediently, the respective axial surfaces of the two transmission elements with the ball track face toward one another. The at least one ball is then mounted between the ball tracks and thus serves to support one of the transmission elements on the other, while the at least one ball can roll over the two transmission elements as necessary in order to enable adjustment of the transmission.

An advantageous further development of the invention provides that the number of balls guided between the transmission elements is at least three, preferably exactly three. In principle the transmission used with the ball joint could be mounted with only one ball to perform its basic function. For that, however, due to the statically indeterminate support of the transmission elements against one another an appropriate mounting of the transmission elements would have to be provided. When, in accordance with a particularly preferred further development, exactly three balls are guided between the transmission elements, this has the advantage that the first and second transmission elements are supported on one another in a statically determinate manner. Basically, as the number of balls increases the surface pressure on the two transmission elements decreases. Thus, even more than three balls can be used advantageously, in order to keep the component loading as low as possible. In such a case, however, there would be a static redundancy in the support of the two transmission elements. Accordingly, the number of three balls is regarded as particularly preferred.

To actuate the transmission used with the ball joint, it is expedient for the second transmission element, i.e. the transmission element that is mounted to rotate about the rotational axis, to be able to be driven in rotation from the outside by way of interlocking engagement means. From the design standpoint the interlocking engagement means preferably consist of a tooth array formed on the second transmission element. These teeth can for example advantageously be brought into engagement with the drive output shaft of an electric motor or a motor-transmission unit. In this case the teeth can serve for example as the worm gear of a so-termed worm drive, wherein on the drive output shaft of the electric motor a spiral worm wheel is formed that engages with the worm gear in order to drive it. An advantage of a worm drive for driving the second transmission element is its self-locking action.

Basically, it is conceivable that the at least one ball is guided exclusively by the respective adjacent ball tracks in each of the transmission elements. However, particularly when, as preferred, a plurality and in particular three balls are used, it is advantageous for a ball cage to be arranged as guiding means for the at least one ball along the ball track. In such a case the ball cage performs the function of keeping the several balls at a defined distance from one another and can besides serve to prevent an escape of the balls. The ball cage can for example be made of metal, plastic, or a fiber-reinforced plastic.

The ball cage is preferably an essentially disk-shaped component, preferably arranged in such manner that its central axis coincides with the rotational axis of the ball joint. When the transmission is actuated the second transmission element rotates about the rotational axis. As a result, the at least one ball and the ball cage guiding it rotate about the rotational axis in the same rotation direction as the second transmission element.

To achieve a compact structure and reliable guiding of the at least one ball, on its axial surfaces the ball cage preferably has an external contour designed essentially to match a respective opposite external contour of the adjacent transmission element.

Expediently, in the ball cage a plurality of openings equal to the number of balls are provided, for the at least partial accommodation of one ball in each case.

Particularly reliable guiding of the at least one ball guided between the two transmission elements can be achieved if, in the mounted condition, the first and second transmission element, and preferably also the ball cage, are connected with one another with interlock in such manner that the interlock prevents any translational movement of those components in a plane perpendicular to the rotational axis, but the components can rotate relative to one another about the rotational axis. The effect can be achieved in design terms in a particularly advantageous way if a cylindrical section is formed on the first transmission element, which extends through a cylindrical aperture in the ball cage and fits into a cylindrical recess in the second transmission element. The design described ensures that the first and second transmission elements and the ball cage cannot be displaced relative to one another in the plane particular to the rotational axis, but can rotate relative to one another about the rotational axis in order to be able to fulfill the function of the transmission.

To determine an initial position of the transmission, according to an advantageous further development of the invention, a stop is formed on the first and on the second transmission elements, which corresponds with a stop formed on the ball cage in each case. By providing a stop, the transmission can by correspondingly bringing the stops together always be brought to a known initial position, which may be departed from during previous operation due to slip that occurs at the balls.

According to the invention, the first transmission element is mounted so that it can be displaced axially. Such axially mobile fitting can be achieved in various ways, and for that purpose an anti-rotation lock is advantageously associated with the first transmission element, which while ensuring that axial displacement is possible, prevents the first transmission element from rotating about the rotational axis.

To ensure reliable operation, it should be ensured that at any time the at least one ball is between the ball tracks of the two transmission elements. Thus, a spring unit is advantageously associated with the transmission, by means of which the two transmission elements can be prestressed relative to one another. A prestressing force applied by the spring unit can in this way effectively prevent the ball from escaping from the guiding path defined by the two ball tracks.

For the frictional resistance to be adjustable as accurately as possible in the ball joint, the ball joint is advantageously characterized in that it comprises a device which allows a set rotational angle of the second transmission element to be assigned to an axial force exerted on the movable housing component and to be stored. The device can preferably be operated on the basis of the stored relationship between rotational angle and axial force, by specifying a rotational angle of the second transmission element required for producing a desired axial force.

The invention also relates to a transmission according to the independent claims, in particular for a ball joint as described earlier. The transmission comprises first and second transmission elements, on each of which a ball track of helical shape relative to a rotational axis is formed, such that the first and second transmission elements rest against each other in the axial direction via at least one ball guided between the ball tracks, and such that the first transmission element is mounted so that it can move axially, whereas the second transmission element is mounted so that it can rotate about the rotational axis, in such manner that by rotating the second transmission element, the first transmission element can be moved axially.

BRIEF DESCRIPTION OF THE DRAWINGS

Below, the invention is explained in greater detail and described with reference to an example embodiment and a modification thereof. From the example embodiment and the modification shown, further advantageous features of the invention also emerge. The figures below show:

FIG. 5: A view from above of the first transmission element (lower ball ramp) of FIG. 4, with balls arranged on it.

DETAILED DESCRIPTION OF THE PREFERRED EMBODIMENTS

Figure 1:
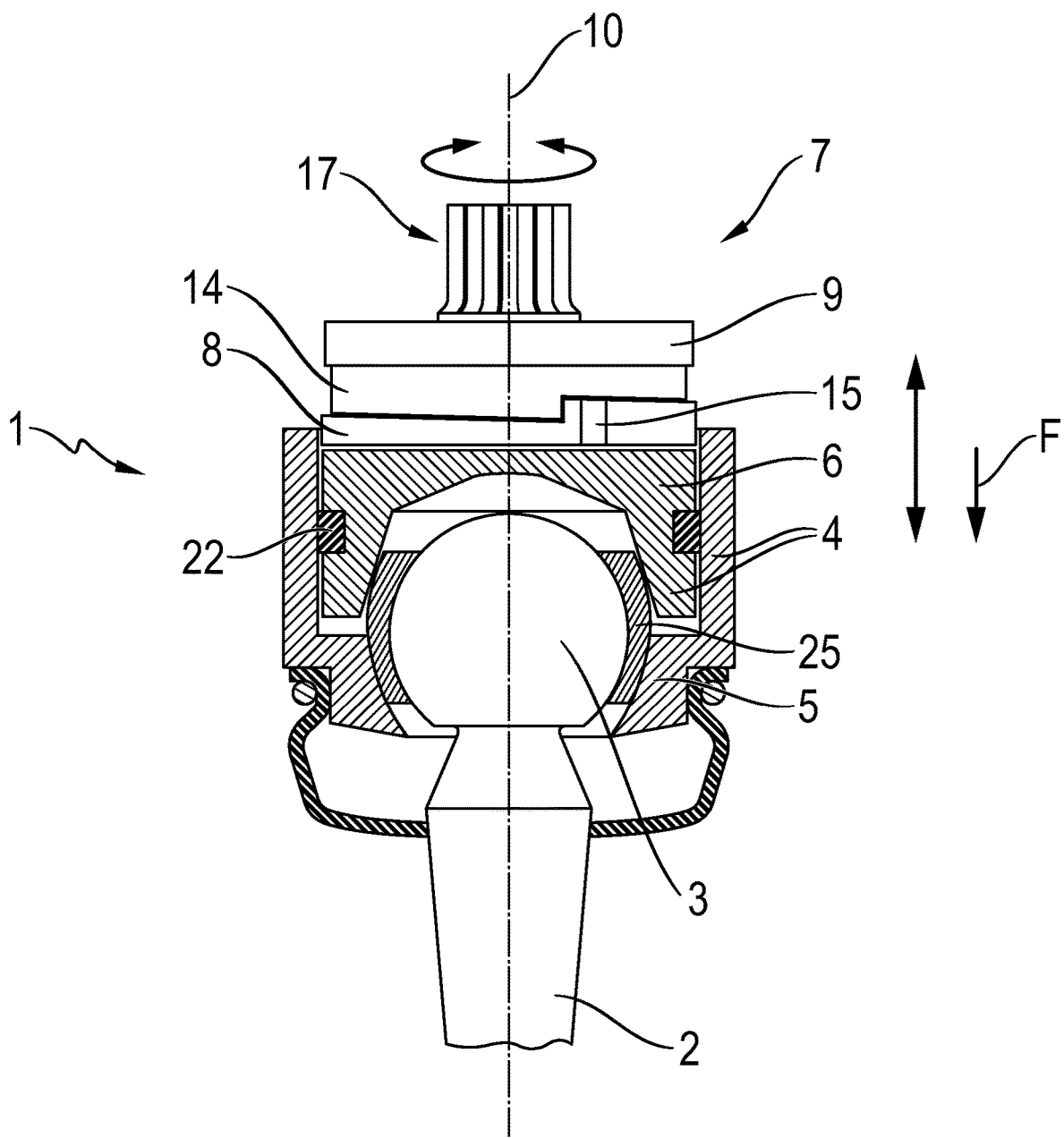
FIG. 1: A lateral sectional view of an example embodiment of a ball joint, represented schematically.

FIG. 1 shows a schematic, sectioned representation of a ball joint 1 with variable frictional resistance, according to an example embodiment of the present invention. The ball joint 1 can be used in various applications, preferably serving to connect two components of a vehicle in an articulated manner, in particular two components of its chassis. The ball joint 1 comprises a ball stud 2 provided with a joint ball 3. The joint ball 3 of the ball stud 2 is held in a joint housing 4 in order to be articulated relative to it. Thus, the ball stud 2 can rotate and pivot relative to the joint housing 4.

The joint housing 4 comprises two housing parts 5, 6 that can move relative to one another, which engage on opposite sides of the joint ball 3. The housing part 5 is a static housing part and supports the joint ball 3 on the side facing toward the neck of the ball stud, whereas the housing part 6 is a moving housing part which is arranged like a piston within the static housing part 5 that functions as a cylinder, and can be displaced in the direction of an axis 10 that coincides with the joint axis and with a rotational axis still to be explained. By moving the movable housing part 6 in the direction of the axis 10 in accordance with the double arrow shown on the right next to the ball joint 1, an intermediate space formed between the static housing part 5 and the movable housing part 6 can be made larger or smaller in order to clamp the joint ball 3 with a variable pressure between these two housing parts 5 and 6 and thereby to influence the frictional resistance of the ball joint 1. In the example embodiment shown, the joint ball 3 of the ball stud 2 is not in contact with the housing parts 5, 6 directly, but by way of a common bearing shell 25 made of a deformable material.

To prevent the penetration of dirt or moisture into the inside area of the joint, the housing parts 5, 6 are sealed relative to one another by an annular seal 22. As already known per se and therefore not described or indexed further, at its housing opening—the opening of the joint housing 4 facing toward the ball stud 2—the ball joint 1 is sealed relative to the external environment by a sealing bellows, one end of the bellows being attached to the joint housing 4 while an opposite end of the sealing bellows is attached to the ball stud 2.

Above the movable housing part 6, in the embodiment shown directly adjacent to this, a transmission 7 is arranged which has a rotational axis 10 that coincides with the joint axis of the ball joint 1. The transmission 7, whose structure and function will be explained in greater detail with reference to the following figures, serves to move the movable housing part 6 in the axial direction, i.e. along the direction of the rotational axis 10, so as to, in that way, exert a variable pressure on the joint ball 3. In particular, by means of the transmission 7 an axial force F (indicated in FIG. 1 by the arrow) can be exerted on the movable housing part 6. The structure of the transmission 7 is explained in greater detail below.

Figure 2:
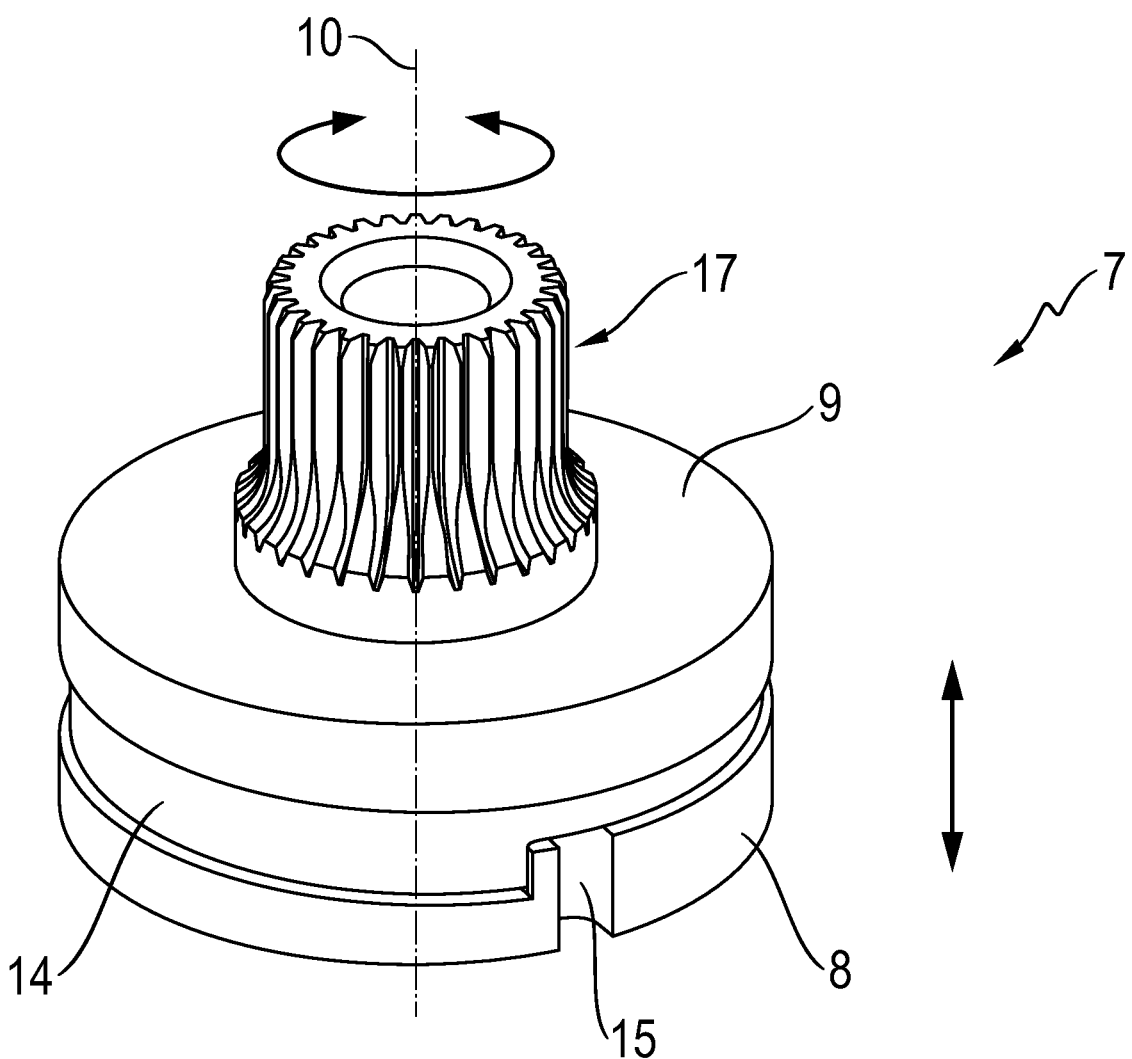
FIG. 2: A perspective view of a transmission which can be used advantageously in the ball joint shown in FIG. 1, FIG. 3: An exploded view of the transmission of FIG. 2, FIG. 4: A perspective view of a first transmission element (lower ball ramp) of the transmission of FIG. 2, with three balls on it.

FIG. 2 shows a transmission 7 that can be used with a ball joint 1 as illustrated in FIG. 1. The transmission 7, which in FIG. 2 is shown in perspective in the assembled condition, is also shown in FIGS. 3 to 6 and FIG. 8 either complete or with reference to individual components, so that the following description relates to all of the above-named figures, wherein the same indexes denote the same components and, to avoid repetition, a single description of the example embodiment shown in the figures is given.

The transmission 7 shown in FIG. 2 comprises a first transmission element 8 and a second transmission element 9. A ball cage 14 is arranged between the first transmission element 8 and the second transmission element 9. The second transmission element 9 has a circular disk-shaped area of large diameter and adjacent to it an area of smaller diameter, on which drive teeth 17 are formed. The drive teeth 17 form the worm gear of a worm drive—shown only in part. In particular, in that way the second transmission element 9 can be driven by a worm screw, for example arranged on a motor shaft.

In the area visible in FIG. 2 the ball cage 14 and the first transmission element 8 are essentially disk-shaped. The first transmission element 8, the second transmission element 9 and the ball cage 14 are arranged coaxially on the rotational axis 10 and can be rotated relative to one another about this rotational axis 10. Depending on the relative rotational angle adopted by the second transmission element 9 relative to the first transmission element 8, the axial distance between the first transmission element 8 and the second transmission element 9 changes, as indicated by the double arrow to the right of the transmission 7.

Figure 3:
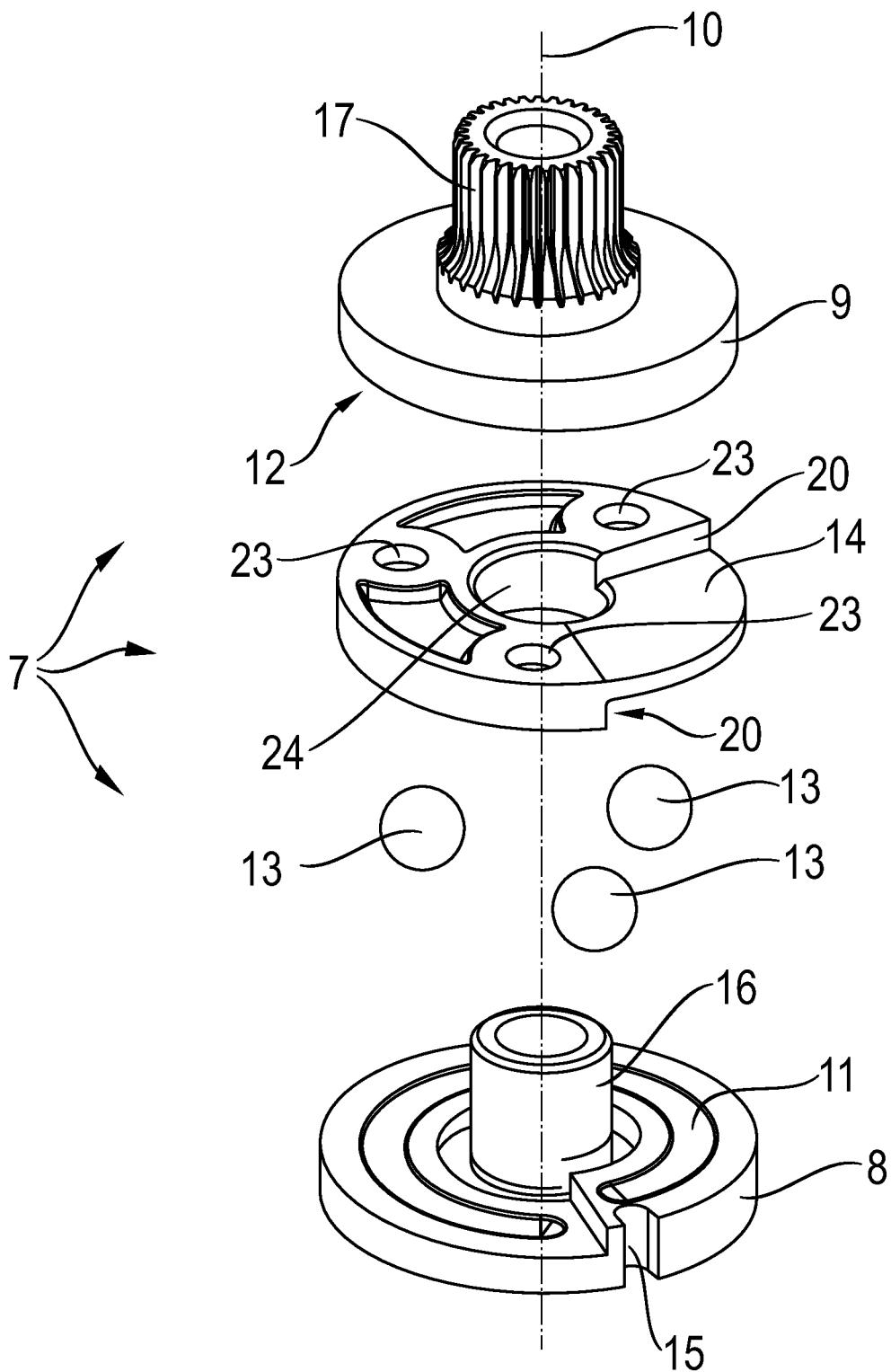

FIG. 3 shows an exploded view of the transmission 7 along the rotational axis 10. From the figure it can be seen that the first transmission element 8 has a circular disk-shaped area of large diameter and a cylindrical section 16 with a smaller diameter. The first transmission element 8 is made in one piece from metal. While the first transmission element 8 is flat on the underside (the side facing toward the movable housing part 6 in FIG. 1), on the side of the first transmission element 8 facing toward the second transmission element 9 an all-round inclined plane is formed. Into this inclined plane a ball track 11 is machined, which relative to the rotational axis 10 has a helical shape. The ball track 11 rises from a starting point a short axial distance away (from the lower axial surface) to an end point a larger axial distance away. In the area of the end point of the ball track 11, on the first transmission 8, in its circumferential area, a groove extending in the axial direction is formed, which serves as an anti-rotation lock 15. By means of the anti-rotation lock 15 it is ensured that although the first transmission element 8 can move axially in the direction of the rotational axis 10, it cannot rotate about the rotational axis 10. Thus, the first transmission element 8 can also be called a displaceable ball ramp.

As shown in FIGS. 4 and 5, the ball track 11 formed on the first transmission element 8 serves to receive three balls 13, these three balls 13 can roll along at least part of the ball track 11. From FIG. 5, in particular, it can be seen that the ball track 11, in axial projection, forms part of a circle, i.e. the distance from the ball track 11 to the rotational axis 10 is constant.

From FIG. 3 it can be seen that the three balls 13 guided in the ball track 11 are kept a fixed distance away from each other by means of a ball cage 14. The ball cage 14 is an essentially disk-shaped component made of fiber-reinforced plastic, which has at the center thereof an aperture 24 through which, in the assembled condition of the transmission 7, the cylindrical section 16 formed on the first transmission 8 extends. In the ball cage 14 round cut-outs 23 are formed for each of the three balls 13, these cut-outs at least partially holding one ball 13 each. Thus, each of the balls 13 is guided along a circumferential section in its associated cut-out 23.

Deviating from a purely circular disk shape, the ball cage 14 has on its two axial surfaces an external contour which is essentially shaped to match the respective external contour of the adjacent transmission element 8, 9. In other words, on the two axial surfaces of the ball cage 14 there is, in each case, an all-round inclined plane whose shape corresponds to the inclined plane of the respective opposite transmission element 8, 9. It should be pointed out that an oblique plane formed on the second transmission element 9 and a ball track 12 formed in it cannot be seen directly in FIG. 3. Thus, it must be made clear that on the underside of the second transmission element 9 a ball track 12 complementary to the ball track 11 on the first transmission element 8 is formed on a corresponding all-round inclined plane.

Both on the first transmission element 8 and on the second transmission element 9, in each case, a stop 18 is formed (in the drawing of FIG. 4 only the stop 18 on the first transmission element 8 can be seen), which corresponds with a respective stop 20 formed on the ball cage 14 in order to determine an initial position of the transmission 7. The stops 18 and 20 on the transmission elements 8, 9 and the ball cage 14, respectively, bridge the axial offset between the starting and end areas of the inclined surfaces formed on the respective components.

Figure 6:
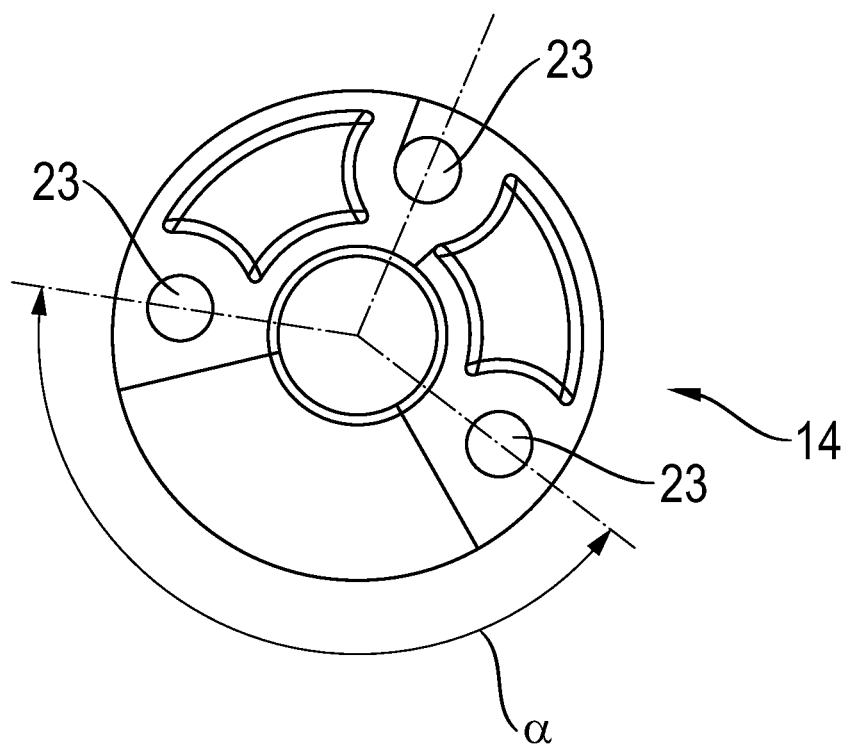
FIG. 6: A view from above, of a ball cage of the transmission shown in FIG. 2, FIG. 7: View from above, of a modified ball cage.

As shown in FIG. 6, the ball guiding holes 23 are not distributed uniformly (i.e. separated by angles of 120 degrees) around the circumference, but are arranged in such manner that between a first ball—in relation to the shape of the ball track—and a last ball there is an angle α larger that 120 degrees, so that in total the transmission 7 has a maximum achievable rotational angle of around 230 degrees between the first transmission element 8 and the second transmission element 9. This large rotational angle allows a large axial stroke (the "transmission stroke") of the transmission 7 to be achieved.

Figure 7:
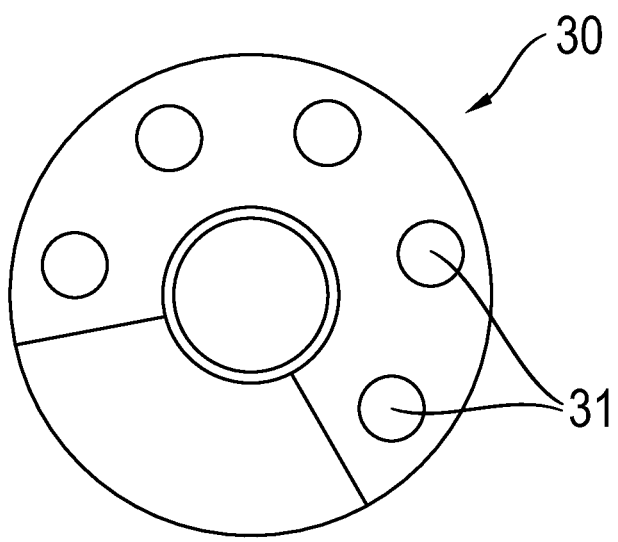

In a modified version of the ball cage 30, as shown in FIG. 7, this can alternatively be provided with five ball guiding holes 31, whereby a transmission of the type previously described could be operated with five balls. Although compared with the first transmission component, in relation to the support of the second transmission component such a transmission would be statically redundant, due to the larger number of balls, the surface pressure on the ball tracks would be reduced as well as the component loading.

Figure 8:
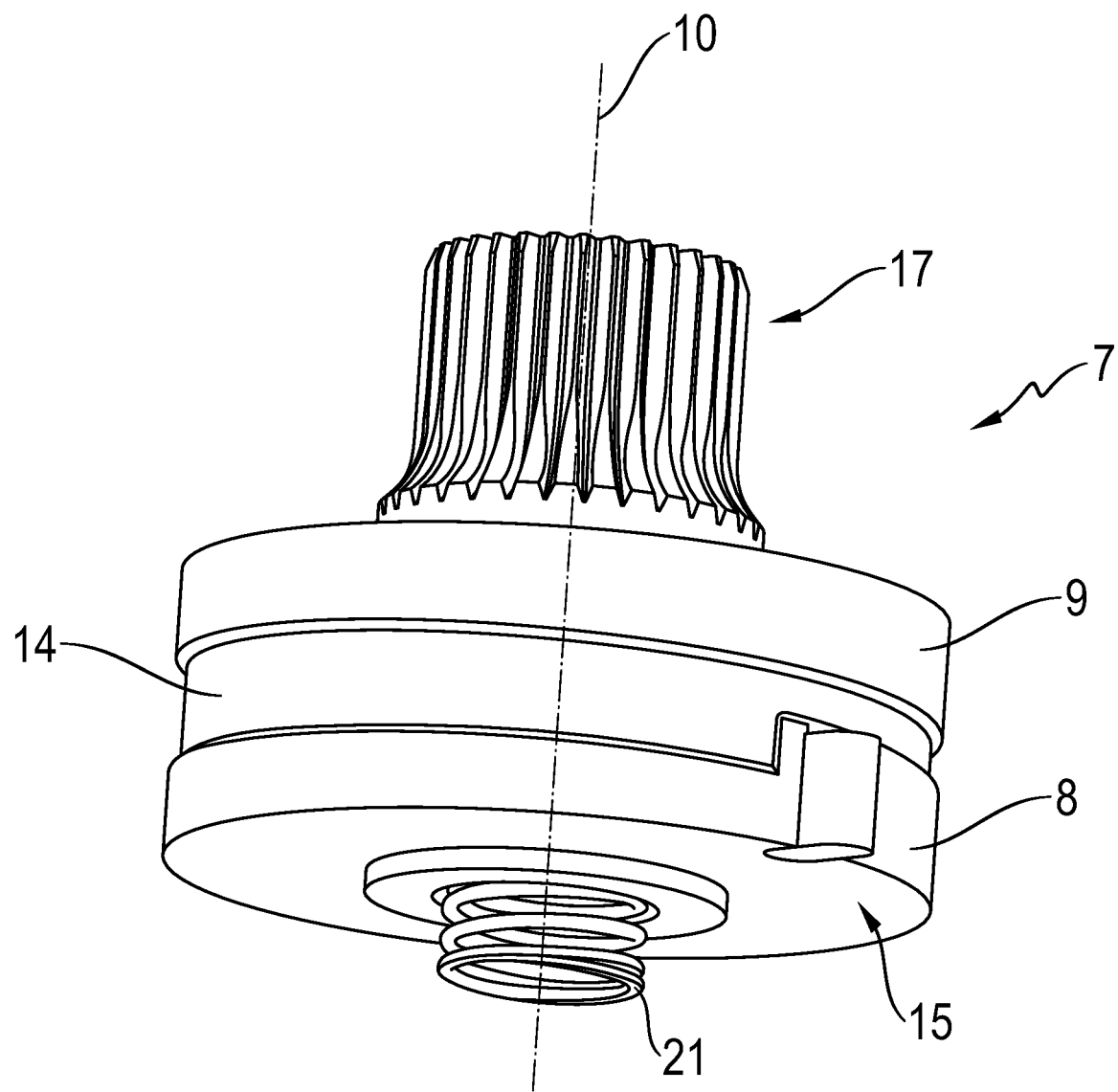
FIG. 8: A perspective view, seen obliquely from below, of the transmission according to FIG. 2.

Finally, FIG. 8 shows the transmission 7 explained with reference to FIGS. 2 to 6, in a perspective view seen obliquely from below. In particular, it can be seen from the figure that the axial groove formed at the circumference of the first transmission element 8 is filled by a pin which in this case acts as an anti-rotation lock 15. When the transmission 7 is mounted into an appropriately designed housing arrangement, the first transmission element 8 could therefore be guided axially, whereas rotation about the rotational axis 10 would be prevented.

On the underside of the first transmission element 8, i.e. the side of the first transmission element 8 facing toward the movable housing part 6, a spring element 21 is also provided. This is in the form of a spiral spring which, in the assembled condition of the ball joint 1, rests against the movable housing part 6 (see FIG. 1) and has the effect that the first transmission element 8 is prestressed against the second transmission element 9. This effectively prevents any escape and/or slip of the balls—for example due to loss of contact.

With regard to the mode of operation, a transmission 7 is therefore obtained which comprises a first transmission element 8 in the form of a movable ball ramp and a second transmission element 9 in the sense of a rotatable ball ramp, on each of which a respective ball track 11, 12 of helical shape in relation to the rotational axis 10 is formed. The first transmission element 8 and the second transmission element 9 rest against one another in the axial direction 10 via three balls 13, which are guided by rolling between the ball tracks 11, 12 formed on the transmission elements 8, 9 facing toward one another. The first transmission element 8 can move in the axial direction 10 whereas the second transmission element 9 is designed to rotate about the rotational axis 10. The effect of the collaboration of the helical ball tracks with the three balls between them is that by rotating the second transmission element 9 about the rotational axis, the first transmission element is displaced axially. Thus, the transmission 7 converts rotational movement applied to the second transmission element 9 (on the drive input side), with great efficiency, into a translational movement of the first transmission element 8 (on the output side) in the axial direction. Since the transmission 7 can be brought into mechanical pressure contact with the movable housing part 6 by adjusting the transmission 7, an axial force F can be exerted on the movable housing part 6 with the result that a pressure which depends on the rotational angle of the second transmission element 9 is exerted on the joint ball 3, so that a variable frictional resistance of the ball joint 1 can be regulated.

INDEXES

1 Ball joint
2 Ball stud
3 Joint ball
4 Joint housing
5 Static part of the housing
6 Movable part of the housing
7 Transmission
8 First transmission element (movable ball ramp)
9 Second transmission element (rotatable ball ramp)
10 Rotational axis, joint axis
11 Ball track
12 Ball track
13 Transmission ball 14 Ball cage
15 Anti-rotation lock
16 Cylindrical body
17 Drive teeth
18 Stop
19 All-round inclined plane
20 Stop
21 Spring element
22 Seal
23 Ball guiding hole
24 Central aperture
25 Bearing shell
30 Ball cage
31 Ball guiding hole
α Angle
F Axial force

The invention claimed is:

1. A ball joint with variable friction resistance, the ball joint comprising:
   a ball stud having a joint ball which is held in a joint housing in order to move relative thereto in an articulated manner,
   the joint housing comprising static and movable housing parts that can move relative to one another, and which engage on opposite sides of the ball join,
   a transmission by which at least the movable housing part is movable so as to exert a variable pressure on the joint ball,
   the transmission having first and second transmission elements on each of which a respective ball track, of helical shape relative to a rotational axis, is formed,
   the first and the second transmission elements resting against one another, in an axial direction which is coincident with the rotational axis, via at least one ball that is guided between the ball tracks of the first and the second transmission elements, and
   the first transmission element is mounted to move axially and can be brought into pressing contact with the movable housing part, the second transmission element being mounted so as to rotate about the rotational axis such that rotation of the second transmission element axially moves the first transmission element so as to exert an axial force on the movable housing part.

2. The ball joint according to claim 1, wherein the first and the second transmission elements are each at least partially in the form of a disk-shaped body and have an axial surface which is formed, in each case, as an all-round inclined plane, and the ball tracks being formed respectively in all-round inclined planes of the respective transmission elements.

3. The ball joint according to claim 1, wherein at least three balls are guided between the first and the second transmission elements.

4. The ball joint according to claim 1, wherein the second transmission element is rotatably driven from outside by an interlocking engagement means formed thereon.

5. The ball joint according to claim 1, wherein a ball cage is arranged between the first and the second transmission elements and serves to guide the at least one ball along the ball tracks.

6. The ball joint according to claim 5, wherein the ball cage is a substantially disk-shaped component.

7. The ball joint according to claim 5, wherein an axial surface of the ball cage has an external contour which substantially matches a respective opposite external contour of an adjacent one of the first and the second transmission elements.

8. The ball joint according to claim 5, wherein the ball cage has a number of holes which correspond to the number of balls and which at least partially hold the balls.

9. The ball joint according to claim 5, wherein the first and the second transmission elements, in an assembled condition, and also the ball cage are connected with one another by an interlock in such a manner that the interlock prevents a translational movement of the first and the second transmission elements and the ball cage in a plane perpendicular to the rotational axis, but are rotatable relative to one another about the rotational axis.

10. The ball joint according to claim 5, wherein a cylindrical section is formed, on the first transmission element, which extends through a cylindrical aperture in the ball cage and into a cylindrical recess in the second transmission element.

11. The ball joint according to claim 5, wherein a stop is formed, on the first and the second transmission elements, which corresponds with a respective stop formed on the ball cage in order to define an initial position of the transmission.

12. The ball joint according to claim 1, wherein an anti-rotation lock is associated with the first transmission element which, while ensuring axial mobility, prevents the first transmission element from rotating about the rotational axis.

13. The ball joint according to claim 1, wherein a spring unit is associated with the transmission by which the first and the second transmission elements are prestressed axially against one another.

14. The ball joint according to claim 1, wherein a device by which a set rotational angle of the second transmission element is assigned to an axial force exerted on the movable housing part and can be stored.

15. The ball joint according to claim 14, wherein the device is operable on a basis of a stored relationship, between the rotational angle and the axial force, in order to specify a rotational angle required for producing a desired axial force.

16. A transmission for a ball joint, having a ball stud having a joint ball, which is held in a joint housing in order to move relative thereto in an articulated manner,
   the joint housing comprising static and movable housing parts that can move relative to one another, and which engage on opposite sides of the ball joint,
   at least one of the movable housing parts being movable by the transmission so as to exert a variable pressure on the joint ball,
   the transmission having first and second transmission elements, and a respective ball track of helical shape, relative to a rotational axis, being formed on each of the first and the second transmission elements,
   the first and the second transmission elements resting against one another in an axial direction which is coincident with the rotational axis via at least one ball that is guided between the ball tracks of the first and the second transmission elements, and
   the first transmission element being mounted to move axially and can be brought into pressing contact with the movable housing part, the second transmission element being mounted so as to rotate about the rotational axis, such that rotation of the second transmission element axially moves the first transmission element so as to exert an axial force on the movable housing part, and
   the first transmission element being mounted so that the first transmission element can move axially whereas the second transmission element being mounted so that the second transmission element can rotate about the rotational axis in such a manner that, by rotating the second transmission element, the first transmission element being axially displaced.

17. A ball joint with variable friction resistance for a vehicle, the ball joint comprising:
   a ball stud having a joint ball, the joint ball being received within a joint housing which defines a central axis, the ball stud and the joint ball being rotatable and pivotable relative to the joint housing, the joint housing having a static housing part and a movable housing part, the joint ball being received between the static housing part and the movable housing part such that movement of the movable housing part, along the central axis toward the static housing part, increasing a pressure placed on the joint ball by the joint housing, and movement of the movable housing part along the central axis, away from the static housing part, reduces the pressure placed on the joint ball by the joint housing;
   a transmission having first and second transmission elements, each of the first and the second transmission elements having a surface formed as a helical plane, the first and second transmission elements being coaxially aligned along the central axis such that a surface of the first transmission part and a surface of the second transmission part face each other, and the surfaces of the first and the second transmission elements each have a respective ball track that is helical in shape relative to the central axis;
   at least three balls being located axially between the first and the second transmission elements, each of the at least three balls being received by the ball tracks of the first and the second transmission elements such that the first and the second transmission elements axially contact each other via the at least three balls; and
   the first transmission element being axially movable to contact the movable housing part and the second transmission element being rotatable about the central axis so that movement of the at least three balls, within the ball tracks of the first and the second transmission elements, due to rotation of the second transmission element biases the first transmission element, via the at least three balls, to exert an axial force on the movable housing part and increase the pressure on the joint ball.

* * * * *